US012160700B2

(12) United States Patent
Cochran et al.

(10) Patent No.: US 12,160,700 B2
(45) **Date of Patent: *Dec. 3, 2024**

(54) HEADSET WITH MAJOR AND MINOR ADJUSTMENTS

(71) Applicant: Voyetra Turtle Beach, Inc., White Plains, NY (US)

(72) Inventors: Scot Robert Cochran, San Diego, CA (US); Tim Wiley, San Diego, CA (US); Andy Logan, Newbury Park, CA (US)

(73) Assignee: Voyetra Turtle Beach, Inc., White Plains, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/134,324

(22) Filed: Apr. 13, 2023

(65) Prior Publication Data

US 2023/0247345 A1 Aug. 3, 2023

Related U.S. Application Data

(63) Continuation of application No. 17/726,632, filed on Apr. 22, 2022, now Pat. No. 11,665,465, which is a (Continued)

(51) Int. Cl.
*H04R 1/10* (2006.01)
*H04R 5/033* (2006.01)

(52) U.S. Cl.
CPC ......... *H04R 1/1091* (2013.01); *H04R 1/1066* (2013.01); *H04R 1/1008* (2013.01); *H04R 5/0335* (2013.01); *H04R 2201/107* (2013.01)

(58) Field of Classification Search
CPC .. H04R 1/1091; H04R 1/1066; H04R 1/1008; H04R 5/0335; H04R 2201/107
(Continued)

(56) References Cited

U.S. PATENT DOCUMENTS 5,056,161 A 10/1991 Breen
5,117,465 A 5/1992 MacDonald
(Continued)

FOREIGN PATENT DOCUMENTS

EP 2523469 11/2012
WO 2008/089444 7/2008

OTHER PUBLICATIONS

European Search Report corresponding to European Patent Application No. 16179831.9-1910, mailed Nov. 21, 2016.

*Primary Examiner* — Sean H Nguyen
(74) *Attorney, Agent, or Firm* — McAndrews, Held & Malloy, Ltd.

(57) ABSTRACT

A method and system for a headset with major and minor adjustments, where the headset comprises a headband, a headband endcap at each end of the headband, a headband slide coupled to each headband endcap, and ear cups operatively coupled to the headband slides. A major adjustment of the headset may include actuating a headband slide in a vertical direction. The ear cups may be operatively coupled to the headband slides utilizing ball detents that may hold the position of the ear cups with respect to the headband slides. The ball detents may comprise a portion of a ball on the headband slide and holes in the ear cup or may comprise a portion of a ball in the ear cup and holes in the headband slide. Each headband slide may be coupled to a headband endcap via a headband pivot.

20 Claims, 6 Drawing Sheets

Related U.S. Application Data continuation of application No. 17/127,446, filed on Dec. 18, 2020, now Pat. No. 11,350,206, which is a continuation of application No. 16/900,536, filed on Jun. 12, 2020, now Pat. No. 10,880,634, which is a continuation of application No. 16/280,908, filed on Feb. 20, 2019, now Pat. No. 10,701,474, which is a continuation of application No. 14/801,232, filed on Jul. 16, 2015, now Pat. No. 10,219,068.

(58) Field of Classification Search
USPC .......................................................... 381/378
See application file for complete search history.

(56) References Cited

U.S. PATENT DOCUMENTS

| | | | | |
|---|---|---|---|---|
| 5,406,037 | A | 4/1995 | Nageno et al. | |
| 6,724,906 | B2 | 4/2004 | Naksen et al. | |
| 8,737,668 | B1 | 5/2014 | Blair et al. | |
| 10,219,068 | B2 | 2/2019 | Cochran et al. | |
| 10,701,474 | B2 | 6/2020 | Cochran et al. | |
| 10,880,634 | B2 | 12/2020 | Cochran et al. | |
| 2003/0037366 | A1 | 2/2003 | Lindgren | |
| 2011/0206216 | A1 | 8/2011 | Brunner et al. | |
| 2012/0140973 | A1 | 6/2012 | Olodort et al. | |
| 2012/0207320 | A1* | 8/2012 | Avital | H04R 1/1041 381/74 |
| 2013/0272560 | A1 | 10/2013 | Dougherty et al. | |
| 2014/0140562 | A1 | 5/2014 | Huang | |
| 2015/0036834 | A1* | 2/2015 | Bauman | H04R 1/1041 381/72 |
| 2016/0134962 | A1* | 5/2016 | Gray | H04R 1/1058 381/371 |

* cited by examiner

FIG. 4B
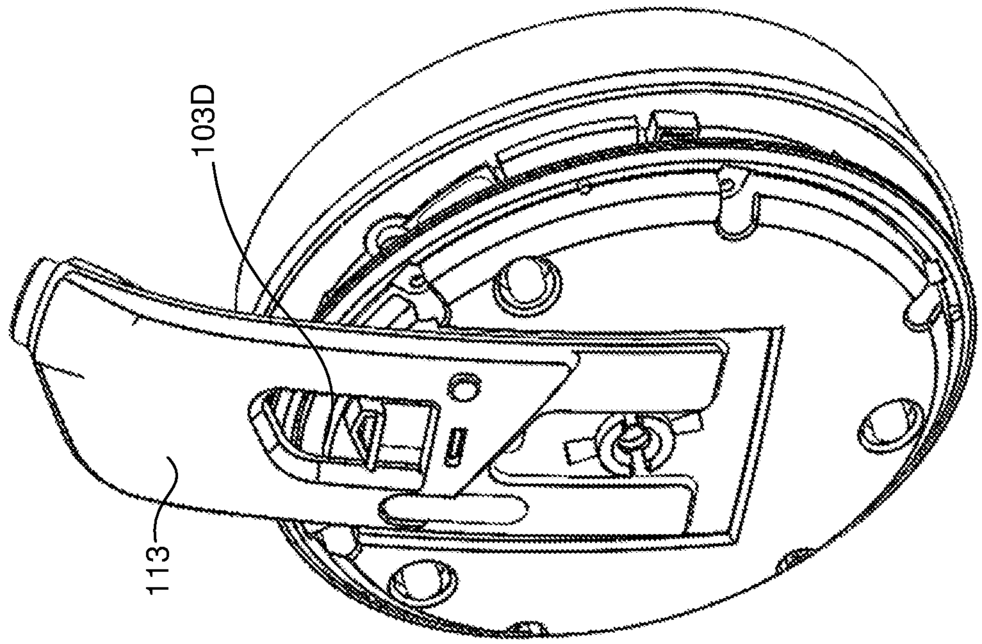
FIG. 4A
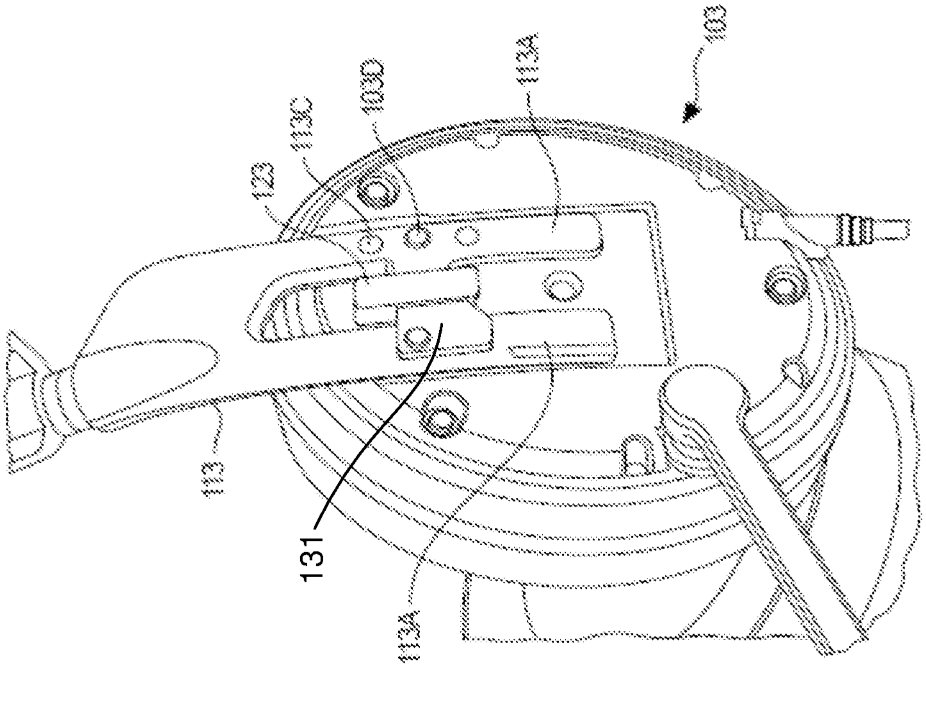
FIG. 4A-4B

FIG. 5B
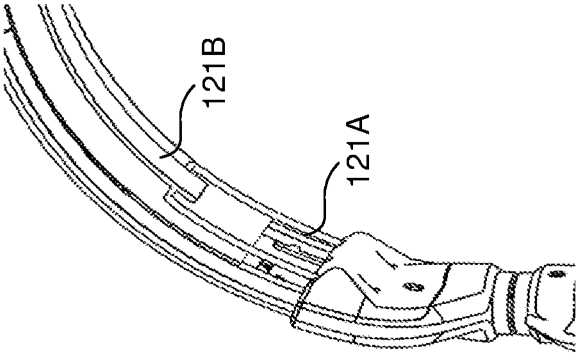
FIG. 5A
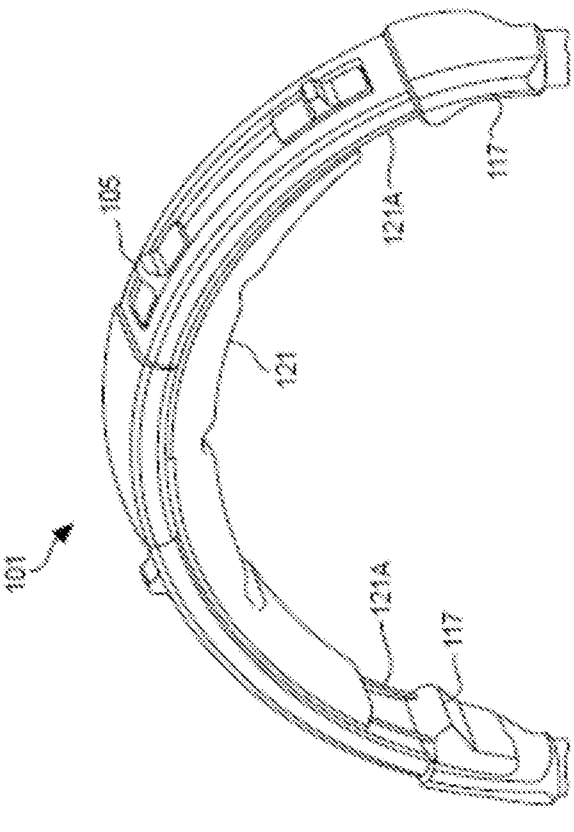
FIG. 5C
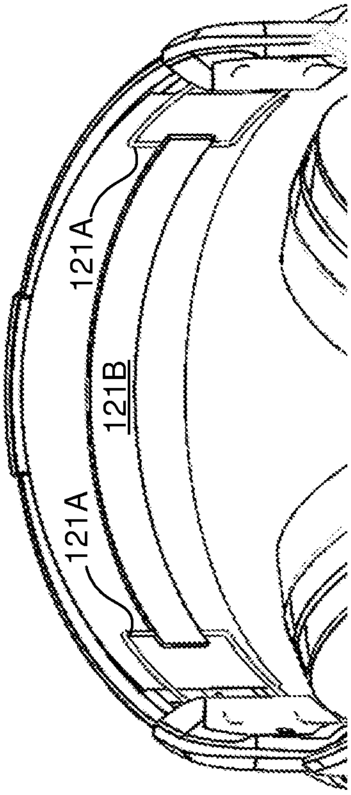
FIG. 5A-5C

HEADSET WITH MAJOR AND MINOR ADJUSTMENTS

CLAIM OF PRIORITY

This application is a continuation of application Ser. No. 17/726,632 filed Apr. 22, 2022, which is a continuation of application Ser. No. 17/127,446 filed Dec. 18, 2020, now U.S. Pat. No. 11,350,206, which is a continuation of application Ser. No. 16/900,536 filed on Jun. 12, 2020, now U.S. Pat. No. 10,880,634, which is a continuation of application Ser. No. 16/280,908 filed on Feb. 20, 2019, now U.S. Pat. No. 10,701,474, which is a continuation of application Ser. No. 14/801,232 filed on Jul. 16, 2015, now U.S. Pat. No. 10,219,068. The aforementioned documents are hereby incorporated herein by reference in their entirety.

INCORPORATION BY REFERENCE

Each of the above stated applications is hereby incorporated by reference in its entirety.

TECHNICAL FIELD

Aspects of the present application relate to audio headsets, and more specifically, to methods and systems for a headset with major and minor adjustments.

BACKGROUND

Limitations and disadvantages of conventional approaches to adjustable headsets will become apparent to one of skill in the art, through comparison of such approaches with some aspects of the present method and system set forth in the remainder of this disclosure with reference to the drawings.

BRIEF SUMMARY

Methods and systems are provided for a headset with major and minor adjustments, substantially as illustrated by and/or described in connection with at least one of the figures, as set forth more completely in the claims.

BRIEF DESCRIPTION OF THE DRAWINGS

FIGS. 4A and 4B illustrate close-up views of an ear cup and headband slide for a headset major adjustment, in accordance with an example embodiment of the disclosure.

FIGS. 5A-5C illustrate close up views of the headband providing headset minor adjustment, in accordance with an example embodiment of the disclosure.

DETAILED DESCRIPTION

Certain aspects of the disclosure may be found in a headset with major and minor adjustments. Example aspects of the disclosure may include, in a headset comprising a headband, a headband endcap at each end of the headband, a headband slide coupled to each headband endcap, ear cups operatively coupled to the headband slides, and a floating headband coupled to the headband endcaps: configuring a major adjustment of the headset by actuating at least one headband slide in a vertical direction. The ear cups may be operatively coupled to the headband slides utilizing ball detents. The ball detents hold the position of the ear cups with respect to the headband slides. The ball detents may comprise a portion of a ball on the headband slide and holes in the ear cup or may comprise a portion of a ball in the ear cup and holes in the headband slide. Each headband slide may be coupled to a headband endcap via a headband pivot. The headband pivot may provide rotational motion of the ear cups with respect to the headband. The floating headband may provide a minor adjustment of the headset. The floating headband may comprise a flexible band with wire segments that extend from the headband endcaps into the floating headband and back down to the headband endcaps.

As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations.

Figure 1:
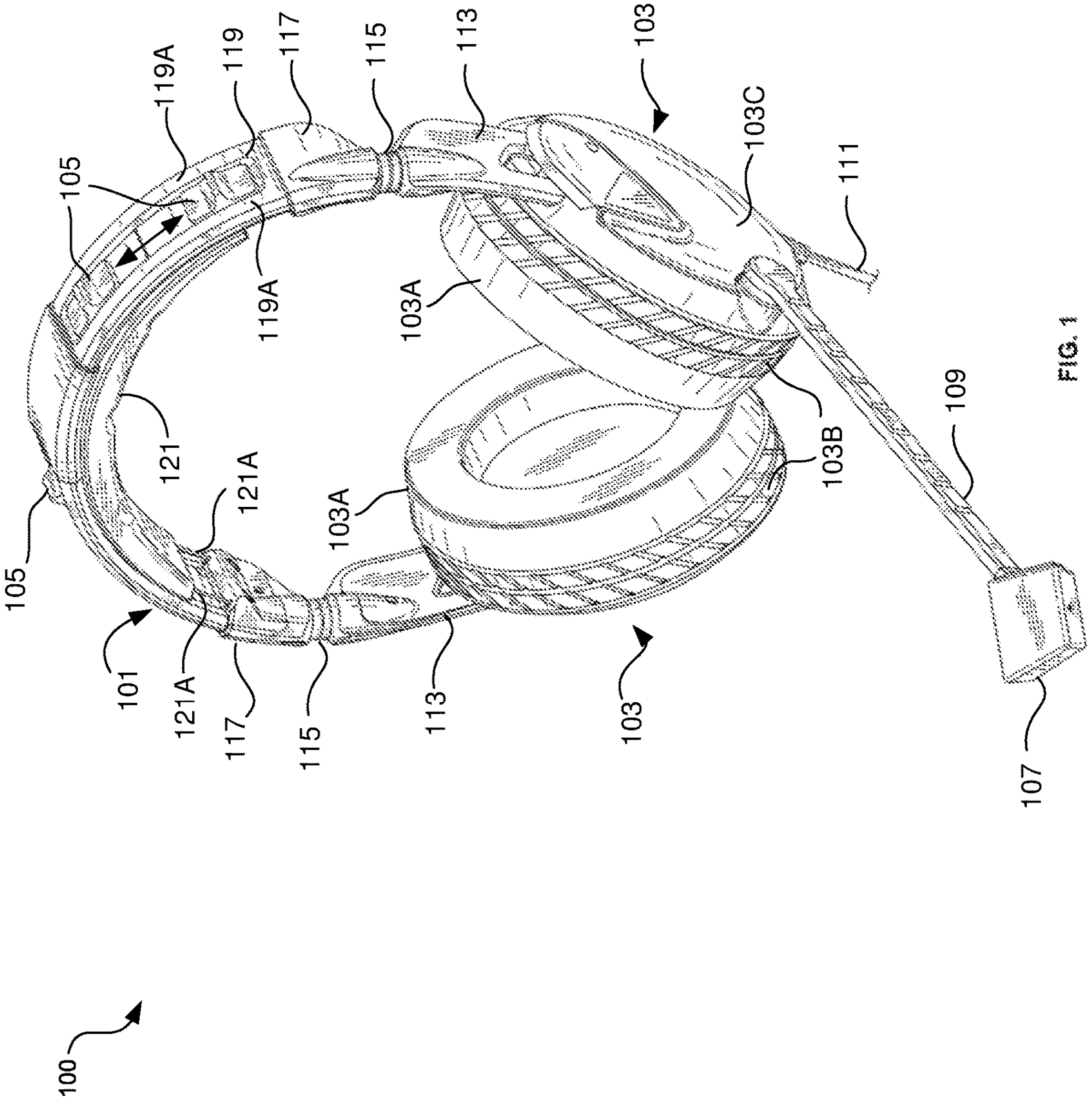
FIG. 1 depicts an oblique view of an example headset, in accordance with an embodiment of the disclosure.

FIG. 1 depicts an oblique view of an example headset, in accordance with an embodiment of the disclosure. Referring to FIG. 1, there is shown a headset 100 with headband 101 and ear cups 103. There are also shown a microphone 107, a microphone boom arm 109, a line-in cable 111, headband slides 113, headband pivots 115, headband endcaps 117, an upper headband 119, and a floating headband 121. The headset 100 may be utilized for gaming, phone, or audio playback purposes, for example. In an example scenario, the headset 100 comprises a powered headset. In another example scenario, the headset 100 comprises a passive headset.

The headband pivots 115 couple the headband slides 113 to the headband endcaps 117, and provide rotational control for the ear cups 103. The ear cups 103 may comprise ear pads 103A, a gimbal gasket 103B, and outer shell 103C.

The microphone 107 provides electrical signals proportional to sound waves detected and may comprise a directional microphone for picking up audio signals from the user while sensing reduced background noise or sound from other sources, for example. The boom arm 109 provides a rigid support for the microphone 107, enabling an optimal position in front of the user for sensing sound from the user.

The upper headband 119 may be coupled to the headband endcaps 117, and slider knobs 105 may be incorporated in the upper headband 119 for adjusting the rigidity of the upper headband 119. In an example scenario, in the region where the slider knobs 105 are integrated, the upper headband comprises two strips 119A of support structure, e.g., metal or rigid plastic, between which the slider knobs 105 may be actuated. The two slider knobs 105 shown between the strips 119A on the right side of the upper headband 119 merely indicate the full range of the slider knobs 105 may travel. The slider knobs 105 may be coupled to a metal or rigid plastic strip above the slider knobs 105 in the upper headband 119. By sliding the slider knobs 105 downward towards the headband endcaps 117, the rigid strip may increase the rigidity of the upper headband 119, thereby increasing force of the ear cups 103 against the ears of the user.

The ear cups 103 may be coupled to the headband 101 via headband slides 113 and to headband endcaps 117 via headband pivots 115. The headband slides may comprise metal or rigid plastic and may comprise a fork structure, where the two tines extend into the ear cups 103 and may have hemispherical ball features thereon that may be slid into detent features in the ear cup 103, thereby providing discrete headset size settings that are held in place utilizing a ball detent structure. This vertical adjustment of the headband slides 113 may comprise a major adjustment of the headset 100. The major adjustment changes the size of the headset 100 as well as the force on the ear.

The force on the ear is adjusted due to the shape and rigidity of the headband 101 and associated parts, such as the headband slides 113. Extending the length of the arms of the headset by pulling the headband slides out of the ear cups 103 may increase the force on the user's ears, as this decreases the distance between the ear cups 103 when not placed on a head, so that more force is needed to expand the headset 100 over the user's head. In contrast, the force on the ear may be decreased by reducing the length of the arms of the headset by pushing the headband slides 113 into the ear cups 103.

Minor adjustment of the headset 100 is enabled by the floating headband 121, which may comprise a flexible band with wire segments 121A that extend from the headband endcaps 117 into the floating headband 121 and back down to the headband endcaps 117. The flexibility in the floating headband 121 therefore provides a minor adjustment of the headset 100.

Figure 2:
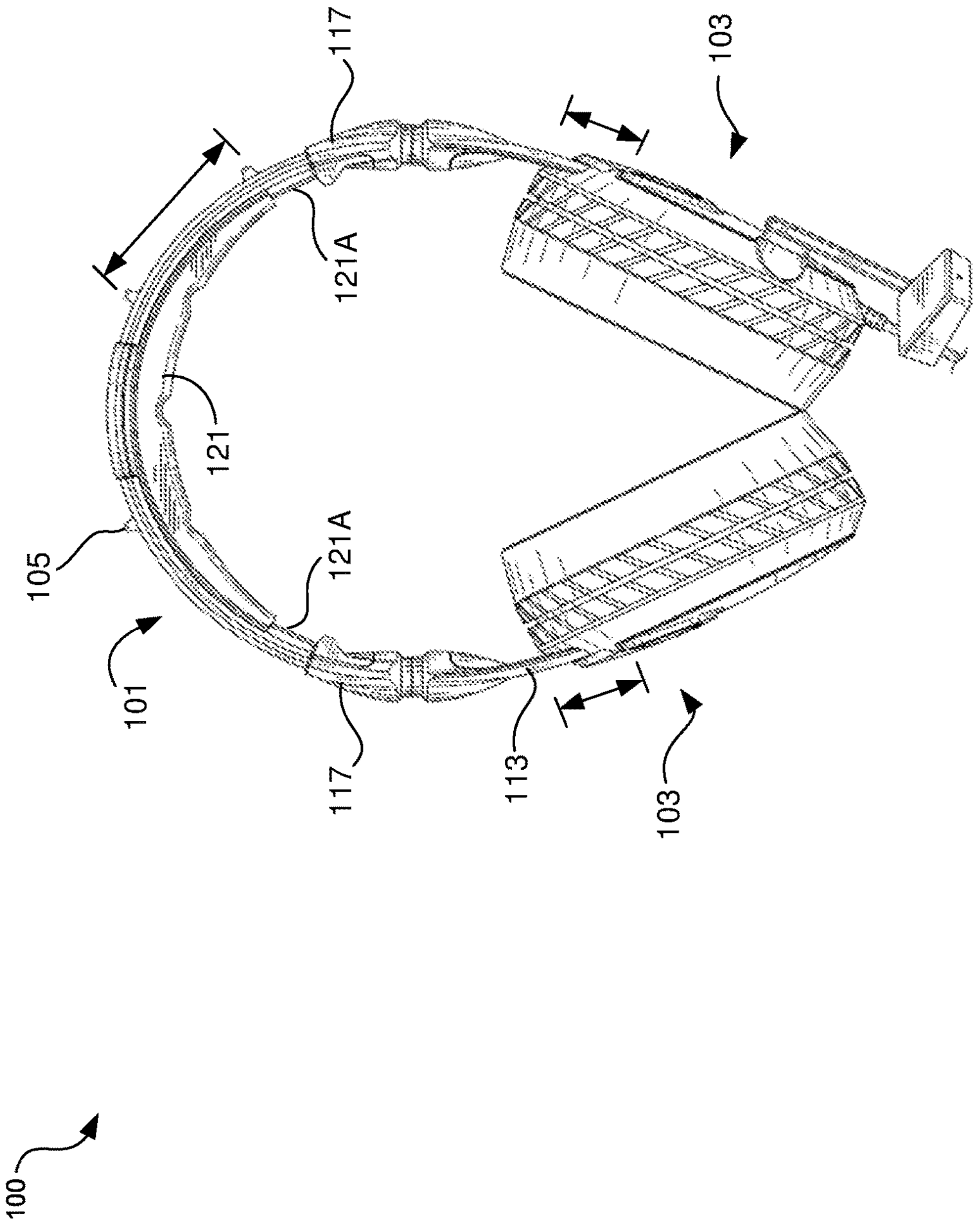
FIG. 2 illustrates a front view of a headset with major and minor adjustments, in accordance with an example embodiment of the disclosure.

FIG. 2 illustrates a front view of a headset with major and minor adjustments, in accordance with an example embodiment of the disclosure. Referring to FIG. 2, there is shown the headset 100 with elements as described with respect to FIG. 1, for example. The arrow in the upper right shows the range of travel for the slider knob 105.

The arrows adjacent to the ear cups 103 illustrate the major adjustment of the headset 100, where the headband slides 113 may be adjusted in and out of the ear cups 103, thereby the size of the headset 100. The headband slides 113 may comprise ball features thereon that may temporarily lock into detent features in the ear cups 103 to hold the setting for the major adjustment.

The arrows above the headband 101 indicate the possible motion of the slider knob that may adjust the tension of the headset 100 by configuring the force of the ear cups 103 against the user's head.

In addition, the headband 101 comprises the floating headband 121 that is coupled to the headband endcaps 117 via the wire segments 121A. The flexibility of the floating headband 121 in concert with the wire coupling provided by the wire segments 121A enables a minor adjustment of the headset 100.

Figure 3:
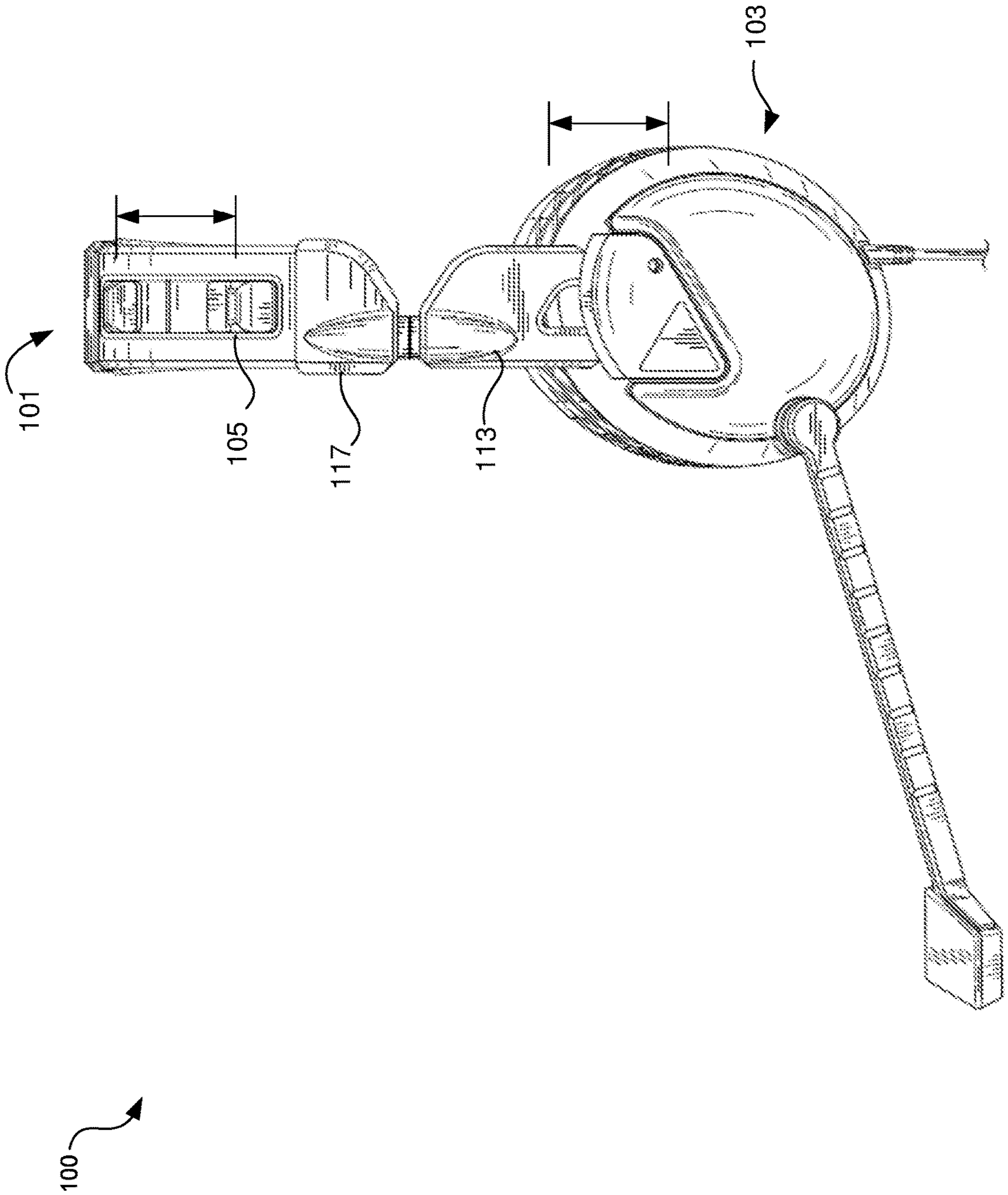
FIG. 3 is a side view of a headset with major and minor adjustments, in accordance with an example embodiment of the disclosure.

FIG. 3 is a side view of a headset with major and minor adjustments, in accordance with an example embodiment of the disclosure. Referring to FIG. 3, there is shown a side view of the headset 100 with the headband 101 and ear cups 103. As shown by the arrows by the headband 101 and the ear cup 103, and as described previously, the headset 100 may be adjusted in various ways. For example, the force on the ear may be adjusted by actuating the slider knob 105.

The arrows adjacent to the headband 101 indicate the possible motion of the slider knob that may adjust the tension of the headset 100 by configuring the force of the ear cups 103 against the user's head.

A major adjustment of the headset 100 may be enabled by the fork-like structure of the headband slide 113, which may move vertically into and out of the ear cup 103. Similarly, the force on the ear is also adjusted due to the shape and rigidity of the headband 101 and associated parts, such as the headband slides 113. Extending the length of the arms of the headset 100 by pulling the headband slides 113 out of the ear cups 103 may increase the force on the user's ears, as this decreases the distance between the ear cups 103 when not placed on a head, so that more force is needed to expand the headset 100 over the user's head. In contrast, the force on the ear may be decreased by reducing the length of the arms of the headset by pushing the headband slides 113 further into the ear cups 103.

FIGS. 4A and 4B illustrate close-up views of an ear cup and headband slide for a headset major adjustment, in accordance with an example embodiment of the disclosure. Referring to FIG. 4A, there are shown an ear cup 103 and headband slide 113, which are as described previously but shown slightly transparent to show details of the headband slide 113 within the ear cup 103.

As can be seen, the headband slide 113 is also shown as slightly transparent to show ball and detent features in the headband slide and ear cup. There is also shown a guide 123 that may guide the headband slide 113 up and down. The guide 123 may comprise a metal or rigid plastic element for accepting a "cross-bar" element between the two tines of the headband slide 113, thereby allowing vertical motion while confining the headband slide 113 in other directions.

The ball detent 103D comprises a hemispherical shape formed of metal or plastic, for example, in the ear cup 103, that may be engaged with holes 113C in the headband slide 113 depending on the position of the headband slide 113 in the ear cup 103. While only one ear cup 103 is shown in FIGS. 4A and 4B, the features shown may also be incorporated in the other ear cup (not shown). In an alternative scenario, the ball detent may instead be in the headband slide 113 and the hole features may be in the ear cup 113.

FIG. 4B illustrates another side view of the headband slide 113 and ear cup 103. As shown in FIG. 4B, the ball detent 103D comprises a ball/hole feature formed in the headband slide 113 and the ear cup 103.

In operation, a user of the headset may pull the headband slides 113 outward from the ear cups 103 to increase the size of the headband 101 or alternatively may push the headband slides 113 further into the ear cups 103 to reduce the size of the headband 101. The ball detent 103D may hold the configured position of the ear cup 103 and headband slide 113. While the size of the headset 100 is configured, changing the position of the headband slides 113 also configures the force on the ear, as extending the ear cups downward places the ear cups 103 closer together.

FIGS. 5A-5C illustrate close up views of the headband providing headset minor adjustment, in accordance with an example embodiment of the disclosure. Referring to FIG. 5A, there are shown the headband 101, headband endcaps 117, floating headband 121, and wire segments 121A. There is also shown slider knob 105 and its full range of travel illustrated by the two positions shown.

The headband 101 comprises the floating headband 121 that is coupled to the headband endcaps 117 via the wire segments 121A. The flexibility of the floating headband 121 in concert with the wire coupling provided by the wire segments 121A enables a minor adjustment of the headset 100, as the floating headband 121 flexes with force from the head of the user.

FIG. 5B illustrates an even closer view of the headband, with the outer surface of the floating headband 121 not shown, for clarity. As shown in FIG. 5B, the wire segments 121A may be coupled to an elastic band 121B, providing the minor headset adjustment due to the flexibility of the elastic band 121B, which is not visible with the outer surface of the floating headband 121.

FIG. 5C illustrates a view of the headband 101 from below, again with the outer surface of the floating headband 121 not shown, so that the wire segments 121A and elastic band 121B are fully visible. In use, the user's head may press against the elastic band 121B, through the outer surface of the floating headband 121, which may stretch somewhat, thereby providing a minor adjustment of the headset 100.

Figure 6:
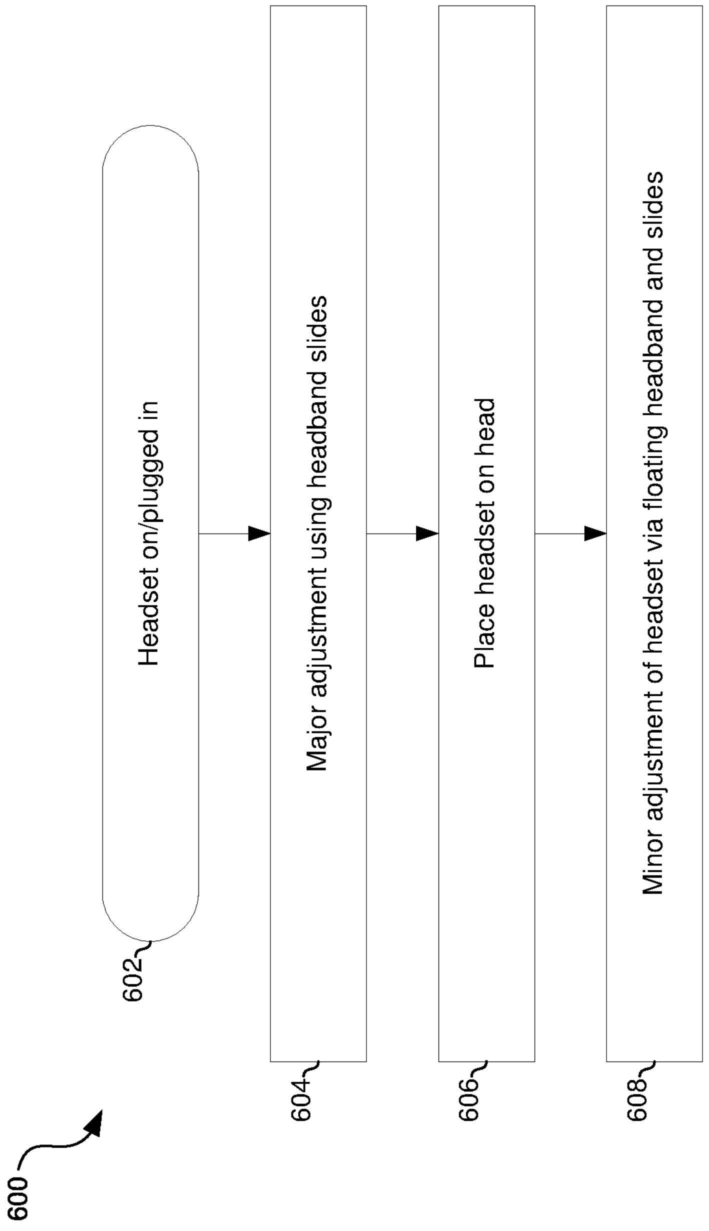
FIG. 6 is a flowchart illustrating an example process for headset major and minor adjustment.

FIG. 6 is a flowchart illustrating an example process for headset major and minor adjustment. Referring to FIG. 6, there is shown a flow chart 600, comprising a plurality of example steps. In step 602, the headset 100 may be powered up for gaming, phone, or music playback purposes where the headset is a powered headset, or may be plugged into a signals source if the headset is a passive headset. In step 604, a major adjustment is made by configuration of the position of the headband slides 113 in the ear cups 103 to configure the size of the headset to comfortably fit the user.

In step 606, the headset 100 may be placed on the user's head, followed by step 608 where a minor adjustment of the headset 100 is enabled by the flexibility of the floating headband against the user's head. In addition a tension adjustment may be made using the slides, increasing or decreasing the force on the user's head.

In an example embodiment of the disclosure a headset with major and minor adjustments is disclosed where the headset may comprise a headband, a headband endcap at each end of the headband, a headband slide coupled to each headband endcap, ear cups operatively coupled to the headband slides, and a floating headband coupled to the headband endcaps. A major adjustment of the headset may comprise actuating at least one headband slide in a vertical direction. The ear cups may be operatively coupled to the headband slides utilizing ball detents. The ball detents may hold the position of the ear cups with respect to the headband slides.

The ball detents may comprise a portion of a ball on the headband slide and holes in the ear cup or may comprise a portion of a ball in the ear cup and holes in the headband slide. Each headband slide may be coupled to a headband endcap via a headband pivot. The headband pivot may provide rotational motion of the ear cups with respect to the headband. The floating headband may provide a minor adjustment of the headset. The floating headband may comprise a flexible band with wire segments that extend from the headband endcaps into the floating headband and back down to the headband endcaps. The force on ears of a user of the headset may be configured by the actuating of the at least one headband slide coupled to a headband endcap.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed is:

1. A headset, the headset comprising:
an ear cup; and
a headband operably coupled to the ear cup via a headband slide and a headband endcap, wherein:
the headband slide comprises a cross-bar that is operably located within the ear cup,
the ear cup comprises a guide for allowing vertical movement of the cross-bar with respect to the ear cup, and
the headband slide is movable in a vertical direction to provide a first adjustment of the headset.

2. The headset of claim 1, wherein the ear cup is operatively coupled to the headband slide utilizing a ball detent.

3. The headset of claim 2, wherein the ball detent holds a position of the ear cup with respect to the headband slide.

4. The headset of claim 2, wherein the ball detent comprises a portion of a ball on the headband slide and holes in the ear cup.

5. The headset of claim 2, wherein the ball detent comprises a portion of a ball in the ear cup and holes in the headband slide.

6. The headset of claim 1, wherein the headband slide is coupled to the headband endcap via a headband pivot.

7. The headset of claim 6, wherein the headband pivot provides rotational motion of the ear cup with respect to the headband.

8. The headset of claim 1, wherein a second headband, comprising a flexible band, provides a second adjustment of the headset.

9. The headset of claim 8, wherein the second headband is coupled to the headband endcap using wire segments that extend from the headband endcap into the second headband and back down to the headband endcap.

10. The headset of claim 1, wherein a force on a user of the headset is increased by extending the headband slide.

11. A method for adjusting a headset, the method comprising:
in a headset comprising:
a headband;
a headband endcap at an end of the headband;
a headband slide coupled to the headband endcap, wherein the headband slide comprises a cross-bar; and
an ear cup operatively coupled to the headband slide, wherein:
the ear cup comprises a guide for restricting movement of the cross-bar away from the ear cup while allowing vertical movement of the headband slide and the cross-bar with respect to the ear cup, and
an actuation of the headband slide in a vertical direction provides a first adjustment of the headset.

12. The method of claim 11, wherein the ear cup is operatively coupled to the headband slide utilizing a ball detent.

13. The method of claim 12, wherein the ball detent holds a position of the ear cup with respect to the headband slide.

14. The method of claim 12, wherein the ball detent comprises a portion of a ball on the headband slide and holes in the ear cup.

15. The method of claim 12, wherein the ball detent comprises a portion of a ball in the ear cup and holes in the headband slide.

16. The method of claim 11, wherein the headband slide is coupled to a headband endcap via a headband pivot.

17. The method of claim 16, wherein the headband pivot provides rotational motion of the ear cup with respect to the headband.

18. The method of claim 11, wherein a second headband comprising a flexible band that provides a second adjustment of the headset.

19. The method of claim 18, wherein the second headband is coupled to the headband endcap using wire segments that extend from the headband endcap into the second headband and back down to the headband endcap.

20. A headset, the headset comprising:

a headband;

a headband endcap at an end of the headband;

a headband slide coupled to the headband endcap; and an ear cup operatively coupled to the headband slide utilizing a ball detent, wherein an adjustment of force on a user of the headset is enabled by an actuation of the headband slide in a vertical direction.

* * * * *